United States Patent
Oh

(10) Patent No.: US 7,725,609 B2
(45) Date of Patent: May 25, 2010

(54) SYSTEM MEMORY DEVICE HAVING A DUAL PORT

(75) Inventor: Jong-Hoon Oh, Chapel Hill, NC (US)

(73) Assignee: Qimonda AG, Munich (DE)

( * ) Notice: Subject to any disclaimer, the term of this patent is extended or adjusted under 35 U.S.C. 154(b) by 342 days.

(21) Appl. No.: 11/198,366

(22) Filed: Aug. 5, 2005

(65) Prior Publication Data
US 2007/0033348 A1  Feb. 8, 2007

(51) Int. Cl.
*G06F 3/00* (2006.01)
*G06F 12/00* (2006.01)
(52) U.S. Cl. .......................................... 710/3; 711/100
(58) Field of Classification Search ...................... 710/3; 711/149; 395/133
See application file for complete search history.

(56) References Cited

U.S. PATENT DOCUMENTS

| | | | | |
|---|---|---|---|---|
| 5,150,328 A * | 9/1992 | Aichelmann, Jr. | ....... | 365/189.03 |
| 5,590,252 A * | 12/1996 | Silverbrook | ............. | 715/500.1 |
| 5,999,476 A | 12/1999 | Dutton et al. | | |
| 6,647,439 B1 | 11/2003 | Nouvet et al. | | |
| 6,785,892 B1 | 8/2004 | Miller et al. | | |
| 6,832,269 B2 | 12/2004 | Huang et al. | | |
| 6,891,543 B2 | 5/2005 | Wyatt | | |
| 6,898,678 B1 | 5/2005 | Six et al. | | |
| 7,099,949 B1 * | 8/2006 | Vanhoof et al. | ............. | 709/230 |
| 2002/0031166 A1 * | 3/2002 | Subramanian et al. | ...... | 375/130 |
| 2003/0086515 A1 * | 5/2003 | Trans et al. | .................. | 375/346 |
| 2003/0101309 A1 | 5/2003 | Chen | | |
| 2004/0024955 A1 * | 2/2004 | Patel | .......................... | 711/100 |
| 2005/0204101 A1 * | 9/2005 | Fukuzo | ........................ | 711/149 |
| 2006/0256716 A1 * | 11/2006 | Caci | ............................ | 370/229 |

FOREIGN PATENT DOCUMENTS

JP  60-19268  1/1985

OTHER PUBLICATIONS

Hermann Eichelle, "Multiprozessorsysteme, Eine Einfuhrung in die Konzepte der modernen Mikrocomputer— und Rechnertechnologie", B.G. Teubner Stuttgart, pp. 26-29, 33-34, 132-133 (1990).
DE Office Action dated Oct. 29, 2007 for German Patent Application DE 10 2006 035 869.4 (3 pgs.).
Korean Office Action for Korean Patent Application No. 2006-0074255 dated Oct. 30, 2007 (6 pages)(with English translation 5 pages).
DE Office Action for German Patent Application No. 10 2006 035 869.4 dated Mar. 30, 2008 (3 pages).

* cited by examiner

*Primary Examiner*—Henry W. H. Tsai
*Assistant Examiner*—Titus Wong
(74) *Attorney, Agent, or Firm*—Dicke, Billig & Czaja, PLLC

(57) ABSTRACT

A computing system having a plurality of processors including a first processor configured with an address port and a second processor configured with an address port, and a memory device having a first port configured as an address port and to alternatively interface with the address port of the first processor and the address port of the second processor.

20 Claims, 3 Drawing Sheets

SYSTEM MEMORY DEVICE HAVING A DUAL PORT

BACKGROUND

The present invention relates to a semiconductor memory system, and in particular, to a memory system including a memory component with a dual port.

Many transportable and wireless applications, such as cellular phones, typically include a baseband processor to perform the communication functions, and also utilize semiconductor memories to aid in processing and for storage. Demand for multiple features and overall sophistication continues to grow for such devices. In some such applications, a two-platform approach has emerged to respond to these challenges of increased feature demand.

In one such approach, an application processor is added to the phone, either embedded in the baseband processor or as an external device. While the baseband processor handles the more traditional communication requirements of the cellular phone, the application processor can run a high-level operating system such as Windows Mobile, games, video streaming and the like. Each of the baseband and application processors, however, typically has their own dedicated memory subsystems. These multiple memory subsystems add to the cost and overall complexity of the system.

For these and other reasons, there exists a need for the present invention.

SUMMARY

One aspect of the present invention provides a random access memory system having a first processor, a second processor, and a memory device. The first processor is configured with an address port and the second processor is also configured with an address port. The memory device is configured with a dual port to alternatively interface with the address port of the first processor and the address port of the second processor.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
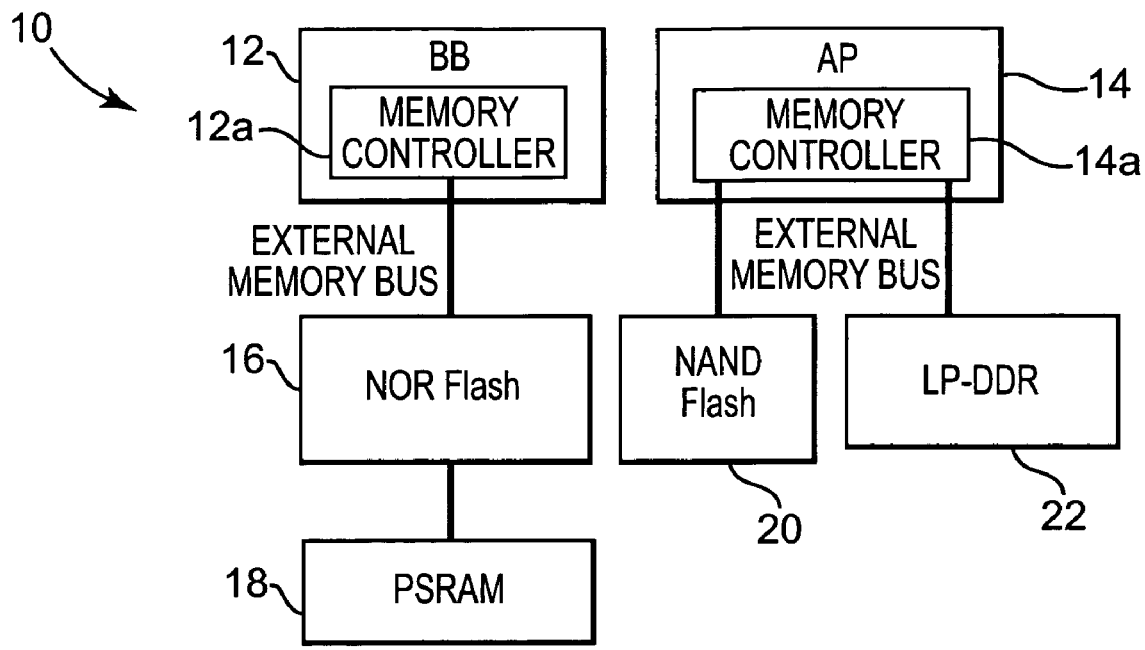
FIG. 1 illustrates a block diagram of a system having both application and baseband processors, each with a dedicated memory subsystem.

FIG. 1 illustrates application system 10. Application system 10 includes baseband processor 12 and application processor 14. Baseband processor 12 includes memory controller 12a and application processor 14 includes memory controller 14a. Application system 10 further includes flash memory 16, random access memory (RAM) 18, flash memory 20, and random access memory (RAM) 22.

In one case, flash memory 16 is a NOR flash memory device and flash memory 20 is a NAND flash memory device, while random access memory (RAM) 18 is a PSRAM device and RAM 22 is a low power double data rate RAM. Flash memory 16 is coupled to baseband processor 12 via an external memory bus and flash memory 16 and RAM 18 are also coupled together via an external memory bus. Flash memory 20 and RAM 22 are each coupled in parallel to application processor 14 via an external memory bus.

In operation, application system 10 is suitable for applications in the mid to high-range cellular phone segments. In one such environment of application system 10, flash memory 16 stores execute-in-place (XIP) code for baseband processor 12. Baseband processor 12 performs a variety of communication functions for application system 10. The XIP code in flash memory 16 then uses RAM 18 for working memory, since the access speed of RAM 18 tends to be significantly faster than flash memory 16. In this way, when needed, the XIP code is copied on to the low power SRD or DDR that it will execute from there.

Similarly, application system 10 utilizes flash memory 20 for cost-efficient storage of application code and data for application processor 14, and then uses the relatively faster RAM 22 for execution and operation. Application processor 14 is dedicated to performing relatively high-level operating system applications thereby providing additional functionality to application system 10. In a typical configuration, the connection between memory controllers 12a and 14a and flash memories 16 and 20 are slow relative to connections to RAMs 18 and 22. A system configured as application system 10 can utilize a shadowing technique where code resident in flash memories 16 and/or 20 is mainly working with an associated SRAM or PSRAM such as RAM 18 or an associated low-power SDR or DDR such as RAM 22.

Figure 2:
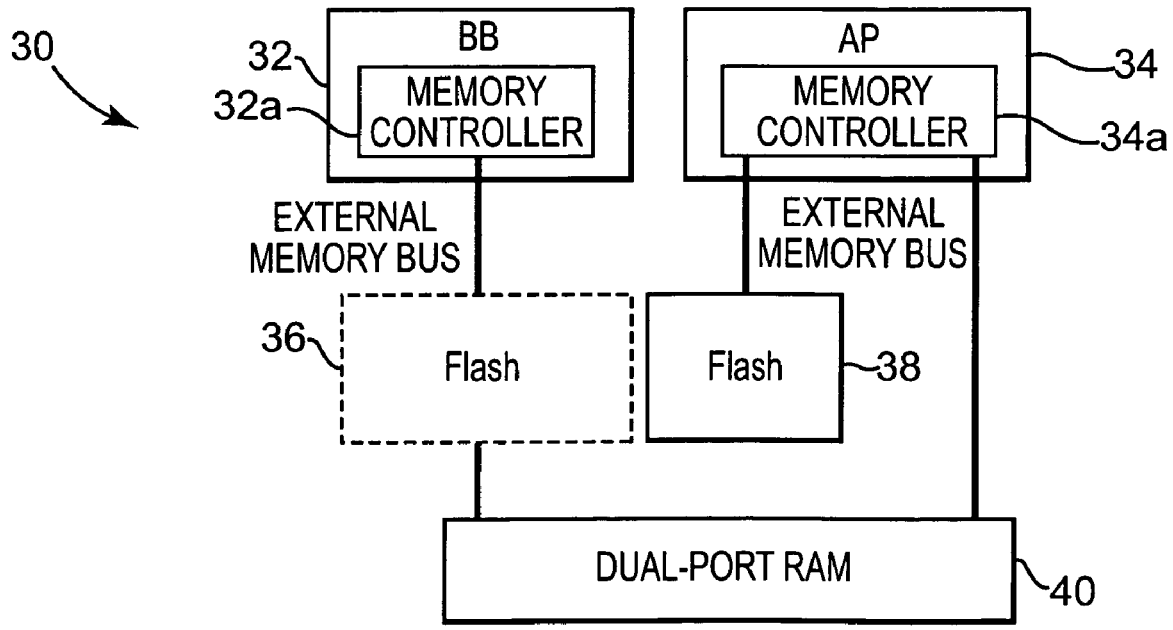
FIG. 2 illustrates a block diagram of an application system having an application processor and a baseband processor with a dual-port memory subsystem in accordance with one embodiment of the present invention.

FIG. 2 illustrates application system 30 in accordance with one embodiment of the present invention. Application system 30 includes baseband processor 32 and application processor 34. Baseband processor 32 includes memory controller 32a and application processor 34 includes memory controller 34a. Application system 30 further includes flash memory 38 and random access memory (RAM) 40. In one alternative embodiment, flash memory 36 is also provided and it is illustrated in dashed lines. Baseband processor 32 performs a variety of communication functions for application system 30. Application processor 34 is dedicated to performing relatively high-level operating system applications thereby providing additional functionality to application system 30.

In one embodiment, memory controller 32a of baseband processor 32 and memory controller 34a of application processor 34 are each coupled to RAM 40 via an external memory bus. Flash memory 38 is then coupled to memory controller 34a of application processor 34. In an alternative case, flash memory 36 is coupled between memory controller 32a of baseband processor 32 and RAM 40. In one case, RAM 40 is a dual-port low-power double-data-rate (LP-DDR) RAM, flash memory 36 is a NOR flash memory device, and flash memory 39 is a NAND flash device.

In one application, application system 30 is suitable for applications in the middle to high-end cellular phone segments. In one such a system, application software and data for both baseband processor 32 and application processor 34 are stored in flash memory 38. Memory controller 34 then accesses this code, and any data in flash memory 38, via the external memory bus and copies the code to RAM 40 for execution there using a shadowing technique. In this way, baseband processor 32 can access any code it needs from this location. In an alternative embodiment, flash memory 36 is provided so that code for baseband processor 32 can be resident there, and will be copied and executed in RAM 40 by baseband processor 32.

RAM 40 is configured to have an access port that supports interface with a plurality of processors. In the illustration of FIG. 2, such a "dual port" is illustrated such that both memory controller 32a of baseband processor 32 and memory controller 34a of application processor 34 each have shared access to RAM 40. In the alternative case, memory controller 32a of baseband processor 32 actually has access via the intermediate flash memory 36. In both cases, memory controller 32a of baseband processor 32 and/or memory controller 34a of application processor 34 multiplex data and address ports of RAM 40. In this way, both baseband processor 32 and application processor 34 can share a single RAM device rather than each having its own dedicated RAM device. Such a dual-port memory device supporting both processors saves significant space on the printed circuit board or other location where application system 30 is resident. In addition, dual-port RAM 40 saves on the cost and complexity of system 30.

Figure 3:
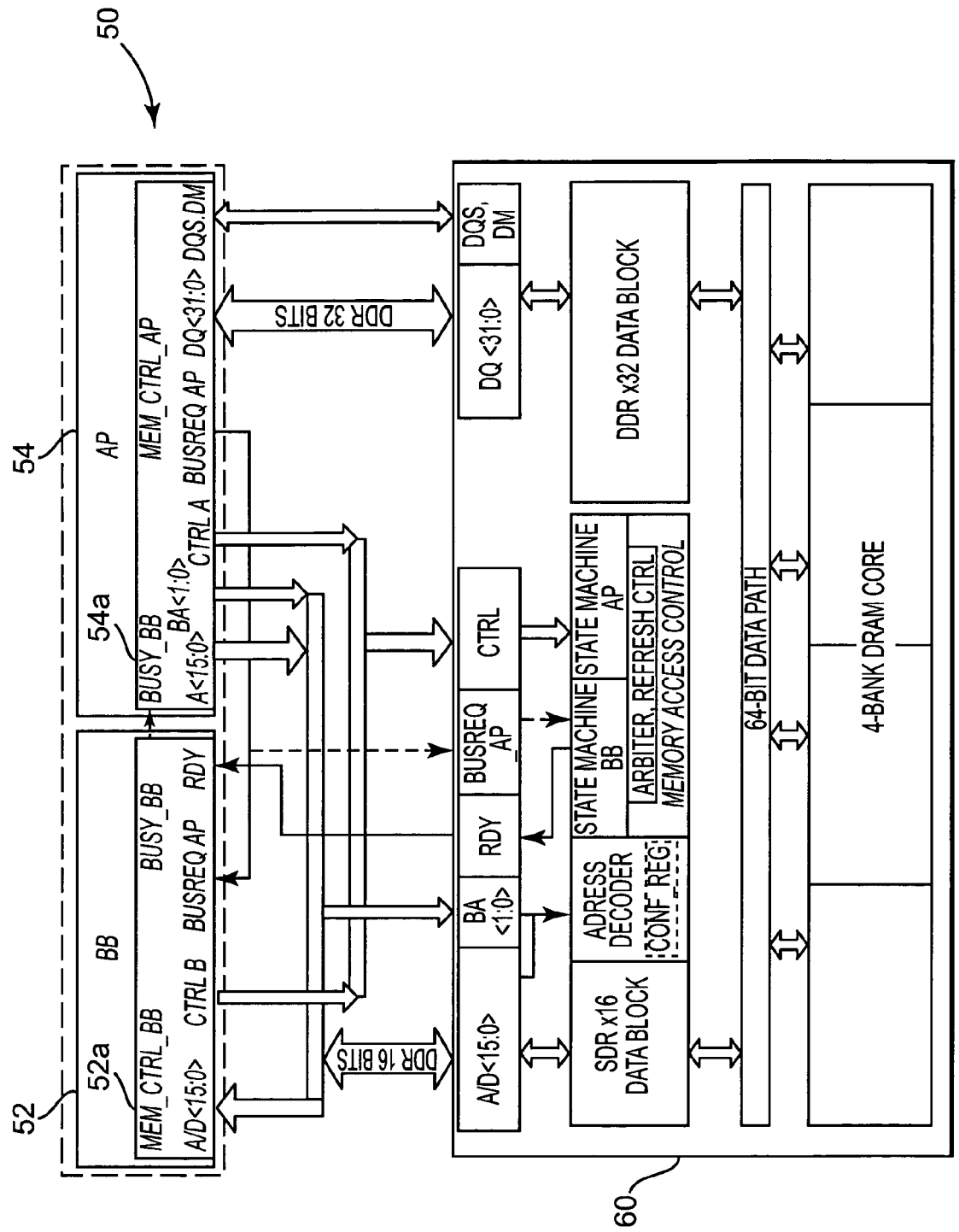
FIG. 3 illustrates a portion of an application system having an application processor and a baseband processor with a dual-port memory subsystem in accordance with one embodiment of the present invention.

FIG. 3 illustrates further detail of application system 50 in accordance with one embodiment of the present invention. Some specific port and pin interfaces of application system 50 are illustrated, and certain portions are illustrated in block form of ease of illustration. Application system 50 includes baseband processor 52, application processor 54, and random access memory device (RAM) 60. Baseband processor 52 includes memory controller 52a and application processor 54 includes memory controller 54a.

In one embodiment, address and data pins (A/D pins) from baseband processor 52 are multiplexed to an address bus of RAM 60, and address pins of application processor 54 also couple to that same address bus of RAM 60. In this way, both baseband processor 52 and application processor 54 are coupled to this "dual-port" (A/D), and thereby share RAM 60. Thus, a dedicated RAM for both processors 52 and 54 is not used, and shared dual-port RAM 60 is used instead.

Memory controller 52a of baseband processor 52 includes a plurality of ports for interfacing with RAM 60 and with application processor 54. In one embodiment memory controller 52a includes multiplexed address and data port (A/D), a control bus port (CTRL B), a bus request port (BUSREQ AP), a ready port (RDY), and a baseband busy port (BUSY_BB). Similarly, memory controller 54a of application processor 54 includes a plurality of ports for interfacing with RAM 60 and with baseband processor 52. In one embodiment, memory controller 54a includes an address port (A), a bank-address port (BA), a control bus port (CTRL A), a bus request port (BUSREQ AP), a DQ bus port (DQ), a DQS port (DQS), and a baseband busy port (BUSY_BB).

In addition, RAM 60 includes a plurality of ports and registers for controlling and managing its interface with both baseband processor 52 and application processor 54. In one embodiment, RAM 60 includes an address and data port (A/D), a bank-address port (BA), a ready port (RDY), a bus request port (BUSREQ AP), a control bus port (CTRL), a DQ bus port (DQ), and a DQS port (DQS). In addition, RAM 60 includes data blocks, an address decoder, and a state machine.

In operation of one embodiment of application system 50, both baseband processor 52 and application processor 54 communicate with the dual address and data port (A/D) of RAM 60. In one embodiment, this is accomplished by having baseband processor 52 interface its address and data port (A/D) with the dual address and data port (A/D) of RAM 60 and multiplex address and data signals on the dual port (A/D). In one example, these are each 16 bit ports <15:1>. Application processor 54 then interfaces its address port (A) with the dual address and data port (A/D) of RAM 60, and interfaces its DQ and DQS ports with the respective DQ and DQS ports of RAM 60. In one example, the address port (A) of application processor 54 is a 16 bit port <15:1>, and the DQ ports are 32 bit ports <31:0>. In this way, application processor 54 and baseband processor 52 each share access to RAM 60 via its dual address and data port (A/D).

In one embodiment, application processor 54 needs more bandwidth relative to baseband processor 52. In this way, a separate DQ bus interfaces application processor 54 and RAM 60 thereby providing a higher bandwidth without increasing the number of pins of the address port (A) of application processor 54. Thus, in one embodiment the DQ bus and DQS bus are dedicated between the application processor 54 and RAM 60. Since in at least some applications baseband processor 52 does not need to operate as fast as application processor 54, the address bus is converted to an address and data multiplex port (A/D) within memory controller 52a of baseband processor 52. In that case, a separate DQ port and DQ bus are not needed for baseband processor 52. In one embodiment, the additional bandwidth provided for application processor 54 allows use of double data rate of DQ bus, while a single data rate is used for the multiplexed address and data bus.

Because a single memory device (RAM 60) is used by two processors (baseband processor 52 and application processor 54), one embodiment of the invention uses arbitration logic to manage any conflict between the processors in accessing the memory. In one embodiment, system 50 uses an application bus request signal (BUSRE_QAP) and a baseband busy signal (BUSY_BB) to arbitrate processor access to the memory. The application bus request signal (BUSREQ_AP), also received by RAM 60, allows application processor 54 to take control of the dual address and data port (A/D) and a baseband busy signal (BUSY_BB) provides an indication to application processor 54 when baseband processor 52 is using the dual address and data port (A/D).

In one example, application processor 54 checks the baseband busy signal (BUSY_BB) to determine whether baseband processor 52 is using the dual address and data port (A/D) of RAM 60 before asserting control. If the baseband busy signal (BUSY_BB) indicates that baseband processor 52 is not using the dual port (A/D), then application processor 54 can simply use the dual address and data port (A/D) of RAM 60. If the baseband busy signal (BUSY_BB) indicates that baseband processor 52 is using the dual port (A/D), then application processor 54 asserts the application bus request signal (BUSRE_QAP) in order to take control of the bus from baseband processor 52 in order to use the dual address and data port (A/D) of RAM 60.

In one embodiment, RAM 60 is provided with a configuration register (CONF_REG). Since both baseband processor 52 and application processor 54 utilize RAM 60, the configuration register (CONF_REG) controls bit mapping so that any conflicts within RAM 60 between the two processors are controlled. In one embodiment, separate memory locations for each of the processors are provided. In this way, when system 50 is booted up, the confusion register establishes a set location within RAM 60 for each processor. For example, some portion of a 4-bank DRAM core is set aside for baseband processor 52 and some different portion of the 4-bank DRAM core is set aside for application processor 54. In an alternative case, this operation is established directly in the processors themselves, so that each processor is programmed with an address range within its own code.

In one embodiment, RAM 60 is also provided with logic arbitration for memory access control. In this way, when a same transaction is accessed by baseband processor 52 and application processor 54, such access can be arbitrated. Furthermore, such logic can include refresh control for operation of DRAM core banks so that refresh operation can be arbitrated within the memory access. In one embodiment, the refresh operation is exclusively controlled by application processor 54 in order to simplify the operation.

In one embodiment, RAM 60 is also provided with a state machine configured to interface with a ready port (RDY), and application bus request port (BUSREQ_AP), and a control port (CNTR), which in turn interface with respective ready ports (RDY), and application bus request ports (BUSREQ_AP), and control ports (CNTR) of baseband processor 52 and application processor 54. In one embodiment, baseband processor 52 and application processor 54 share common control pins. Also in one case, the state machine is divided in two to serve both baseband and the application processors 52 and 54.

Figure 4:
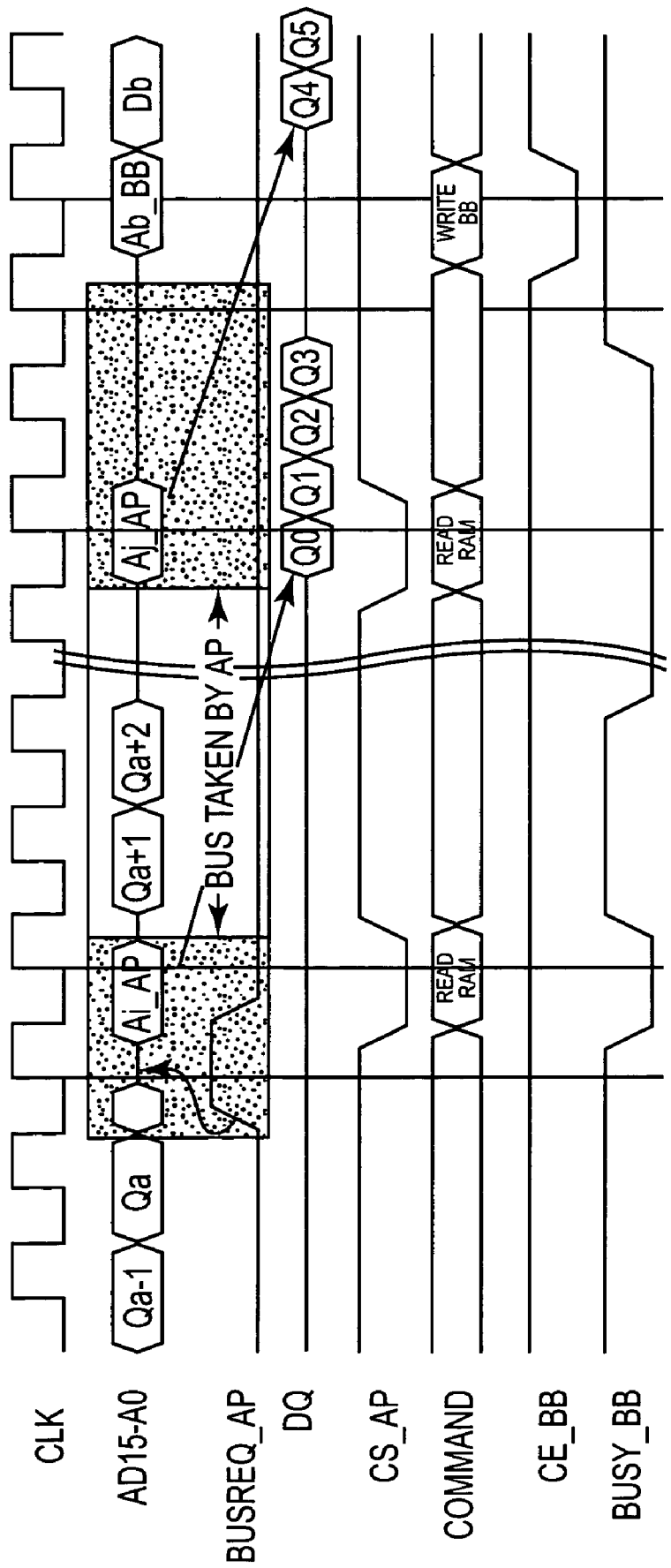
FIG. 4 illustrates an exemplary timing diagram of an application system in accordance with one embodiment of the present invention.

FIG. 4 illustrates an exemplary timing diagram of an application system, such as application system 50, in accordance with one embodiment of the present invention. Signals are temporally illustrated horizontally across the figure, and each is labeled with the corresponding port or ports from application system 50 of FIG. 3.

In operation of application system 50, baseband processor 52 and application processor 54 alternatively accesses RAM 60 as needed via the dual port (A/D). In FIG. 4, a clock signal (CLK) is illustrated at the top of the figure. On the first clock cycle in the illustration, a read command has already been applied and the multiplex address and data (A/D) of baseband processor 52 is reading out data from RAM 60. With the first cycle, data Qa−1 is read, and with the second Qa is read out serially.

Because baseband processor 52 is reading out data, the baseband busy signal (BUSY_BB) is high. In the illustrated example, after the second cycle, the application processor 54 needs to access RAM 60. In this way, application processor 54 generates the application bus request signal (BUSREQ_AP), and then the one clock cycle later, baseband processor 52 releases the bus making the baseband busy signal (BUSY_BB) low. Then, on the next clock cycle, memory controller 54a of application processor 54 sends out an address (AI_AP) on dual port (A/D) of RAM 60 and a corresponding read command (READ RAM). The chip select for application processor 54 (CS_AP) is also asserted. Then, after some latency, the data is read out the onto the DQ bus (Q0, Q1, Q2, Q3), which is dedicated to the application processor 54.

The next cycle after the read command and address are asserted, application processor 54 releases the bus (BUSREQ_AP transitions low) and the dual port comes back to baseband processor 52 (BUSY_BB transitions high again) so that data continues to read out serially (Qa+1, Qa+2) until the data is all read out. Once the baseband processor 52 operation is complete, the baseband busy signal (BUSY_BB) transitions low and releases the bus.

Next in the illustration, several clock signals after baseband processor 52 has completed its read operation from RAM 60, application processor 54 again asserts a read command (READ RAM) and asserts an address (Aj_AP) on the dual port of RAM 60. In this instance, application processor 54 takes control of the bus without first asserting the bus request signal (BUSREQ_AP). The bus request signal is not needed in that case because the baseband busy signal (BUSY_BB) is low, which means the bus is idle. In this way, application processor 54 can simply take the bus. The chip select for application processor 54 (CS_AP) is also asserted, and then after some latency, the data is read out the onto the DQ bus (Q4, Q5).

Finally in FIG. 4, a write operation of the baseband processor 52 is illustrated after the application processor 54 asserts its read operation. In this way, the baseband busy signal (BUSY_BB) is sent high and then a write command (WRITE BB) is subsequently issues by baseband processor 52 and an address (Ab_BB) is placed on the dual-port bus (A/D).

In this way, baseband processor 52 and application processor 54 are able to share a single memory device (RAM 60) by alternatively accessing the dual port (A/D) as needed. Separate chip select signals (CS_AP and CE_BB) can be asserted to select which process is accessing the memory. Handshaking signals, such as the bus request signal (BUSREQ_AP) and the baseband busy signal (BUSY_BB), can be used to arbitrate access of the processors. In alternative embodiments, access to RAM 60 by baseband processor 52 is accomplished via a NOR flash memory interface, where address and data is multiplexed through the interface. In another embodiment, access to RAM 60 by baseband processor 52 is accomplished via multiplexing address and data through the dual port (A/D) of RAM 60, except that more that 16 bits of address and data is sent on the 16 pins by using two cycles.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computing system comprising:
   an address bus;
   a data bus;

a first processor configured with an address and data port coupled to said address bus, and a second processor configured with an address port coupled to said address bus and configured with a data port coupled to said data bus;

a memory device comprising a first port coupled to said address bus, and a second port coupled to said data bus, wherein, for a communication between the memory device and the first processor, the first port of the memory device and the address and data port of the first processor interface via said address bus only, and the memory device is configured to handle both addresses and data from the first processor via said address bus only at its first port, wherein address and data pins of the first processor are multiplexed to said address bus and first port, and neither addresses or data from the first processor is handled at the second port of the memory device, wherein, for a communication between the memory device and the second processor, the first port of the memory device and the address port of the second processor interface via said address bus, and the second port of the memory device and the data port of the second processor interface via said data bus, and the memory device is configured to handle addresses from the second processor via said address bus only at its first port and to handle data from the second processor via said data bus only at its second port.

2. The computing system of claim 1, wherein the address and data port of the first processor is configured such that addresses and data are multiplexed over the address and data port to the first port of the memory device.

3. The computing system of claim 1, further including a first control signal coupled to the memory device and the first and second processors such that the first control signal indicates to the second processor when the first processor is coupled to the address and data port of the memory device.

4. The computing system of claim 3, further including a second control signal wherein such that the second control signal enables the second processor to interrupt the first processor and take over the first port of the memory device.

5. An electronic communication device having a plurality of processors and comprising:

an address bus;

a data bus;

a random access memory component comprising a first port coupled to said address bus, and a second port coupled to said data bus;

a first processor configured with an address and data port coupled to said address bus;

a second processor configured with an address port coupled to said address bus, and configured with a data port coupled to said data bus;

wherein, for a communication between the random access memory component and the first processor, the first port of the random access memory component and the address and data port of the first processor interface via said address bus only, and the random access memory component is configured to handle both addresses and data from the first processor via said address bus only at its first port, wherein address and data pins of the first processor are multiplexed to said address bus and first port, wherein, for a communication between the random access memory component and the second processor, the first port of the random access memory component and the address port of the second processor interface via said address bus, and the second port of the random access memory component and the data port of the second processor interface via said data bus, and the random access memory component is configured to handle addresses from the second processor via said address bus only at its first port and to handle data from the second processor via said data bus only at its second port.

6. The electronic communication device of claim 5, wherein the address and data port of the first processor is configured such that addresses and data are multiplexed over the address and data port to an address and data port of the random access memory component.

7. The electronic communication device of claim 6, wherein the first processor is a baseband processor configured to perform communication functions for the electronic communication device.

8. The electronic communication device of claim 7, wherein the second processor is an application processor configured to perform operating system applications for the electronic communication device.

9. The electronic communication device of claim 5, wherein the electronic communication device is configured as a cellular communication device.

10. A semiconductor memory system comprising:

an address bus;

a data bus;

a random access memory component comprising a first port coupled to said address bus, and a second port coupled to said data bus;

a first processor configured with an address and data port coupled to said address bus;

a second processor configured with an address port coupled to said address bus and configured with a data port coupled to said data bus; and means for controlling access by the first and second processors to the random access memory component, wherein, for a communication between the random access memory component and the first processor, the first port of the random access memory component and the address and data port of the first processor interface via said address bus only, and the random access memory component is configured to handle both addresses and data from the first processor via said address bus only at its first port, wherein address and data pins of the first processor are multiplexed to said address bus and first port, wherein, for a communication between the random access memory component and the second processor, the first port of the random access memory component and the address port of the second processor interface via said address bus, and the second port of the random access memory component and the data port of the second processor interface via said data bus, and the random access memory component is configured to handle addresses from the second processor via said address bus only at its first port and to handle data from the second processor via said data bus only at its second port.

11. The semiconductor memory system of claim 10, wherein the address and data port of the first processor is configured such that addresses and data are multiplexed over the address and data port to an address and data port of the random access memory component.

12. The semiconductor memory system of claim 10, wherein the random access memory component further includes arbitration logic for allocating first portions of memory banks within the random access exclusively for use by the first processor and second portions of memory banks within the random access memory component exclusively for use by the second processor.

13. The semiconductor memory system of claim 10 further configured as an electronic communication device, wherein the first processor is a baseband processor configured to perform communication functions.

14. The semiconductor memory system of claim 13, wherein the second processor is an application processor configured to perform operating system applications.

15. A method of operating a computing system comprising:
providing an address bus;
providing a data bus;
providing a first processor having an address and data port coupled to said address bus;
providing a second processor having an address port coupled to said address bus and a data port coupled to said data bus;
providing a random access memory component comprising a first port coupled to said address bus, and a second port coupled to said data bus;
for a communication between the random access memory component and the first processor, interfacing the first port of the random access memory component and the address and data port of the first processor via said address bus only, and handling both addresses and data from the first processor via said address bus only at its first port, wherein address and data pins of the first processor are multiplexed to said address bus and first port,
for a communication between the random access memory component and the second processor, interfacing the first port of the random access memory component and the address port of the second processor via said address bus, and the second port of the random access memory component and the data port of the second processor via said data bus, and handling addresses from the second processor via said address bus only at its first port and handling data from the second processor via said data bus only at its second port.

16. The method of claim 15, further including multiplexing addresses and data between the address and data port of the first processor and an address and data port of the random access memory component.

17. The method of claim 15, wherein the second processor interrupts the first processor and takes over an address and data port of the random access memory component.

18. A method of processing information in a communication device comprising an address bus and a data bus, the method comprising:

executing communication code in an baseband processor having an address and data port coupled to said address bus, wherein address and data pins of the first processor are multiplexed to said address bus;
executing application code in an application processor having an address port coupled to said address bus and a data port coupled to said data bus; and
controlling access to a random access memory component by both the baseband and application processors, the random access memory component comprising a first port coupled to said address bus, and a second port coupled to said data bus;
wherein controlling access to the random access memory component for a communication between the random access memory component and the baseband processor comprises
interfacing the first port of the random access memory component and the address and data port of the baseband processor via said address bus only, and
handling both addresses and data from the baseband processor via said address bus only at the first port of the random access memory component,
wherein controlling access to the random access memory component for a communication between the random access memory component and the application processor comprises
interfacing the first port of the random access memory component and the address port of the application processor via said address bus, and the second port of the random access memory component and the data port of the application processor via said data bus, and
handling addresses from the application processor via said address bus only at the first port of the random access memory component and handling data from the application processor via said data bus only at the second port of the random access memory component.

19. The method of claim 18, wherein the application processor checks whether the baseband processor is accessing an address and data port of the random access memory component before asserting control of the address and data port of the random access memory component.

20. The method of claim 19, wherein the application processor interrupts the baseband processor when the baseband processor is accessing the address and data port of the random access memory component, wherein the application processor accesses the address and data port of the random access memory component, and wherein the application processor returns control of the address and data port back to the baseband processor when the application processor is finished with accessing the address and data port.

* * * * *